United States Patent [19]

Hollins et al.

[11] Patent Number: 5,684,814

[45] Date of Patent: Nov. 4, 1997

[54] PULSED GAS LASERS

[75] Inventors: Richard Charles Hollins; David Arthur Orchard, both of Malvern, Great Britain

[73] Assignee: The Secretary of State for Defence in Her Britannic Majesty's Government of the United Kingdom of Great Britain and Northern Ireland of Defence Evaluation and Research Agency, Hants, United Kingdom

[21] Appl. No.: 602,766

[22] PCT Filed: Aug. 30, 1994

[86] PCT No.: PCT/GB94/01875

§ 371 Date: Mar. 26, 1996

§ 102(e) Date: Mar. 26, 1996

[87] PCT Pub. No.: WO95/07563

PCT Pub. Date: Mar. 16, 1995

[30] Foreign Application Priority Data

Sep. 4, 1993 [GB] United Kingdom ............ 9318359

[51] Int. Cl.$^6$ ........................................... H01S 3/00
[52] U.S. Cl. .................... 372/38; 372/55; 372/33
[58] Field of Search ..................... 372/38, 68, 58, 372/59, 55, 33, 35

[56] References Cited

U.S. PATENT DOCUMENTS

| | | | |
|---|---|---|---|
| 3,772,613 | 11/1973 | Smith | 372/38 |
| 4,061,986 | 12/1977 | Barker | 372/38 |
| 4,201,949 | 5/1980 | Robbins | 372/38 |
| 4,535,458 | 8/1985 | Inoue et al. | 372/38 |
| 4,648,093 | 3/1987 | Sasnett et al. | 372/38 |
| 4,656,637 | 4/1987 | McCormick | 372/38 |
| 4,722,091 | 1/1988 | Taylor . | |
| 4,899,204 | 2/1990 | Rosen et al. | 372/35 |
| 5,054,029 | 10/1991 | Sugawara et al. | 372/38 |
| 5,305,339 | 4/1994 | Nakatani et al. | 372/38 |
| 5,394,415 | 2/1995 | Zucker et al. | 372/38 |

FOREIGN PATENT DOCUMENTS

| | | |
|---|---|---|
| 1 520 840 | 8/1978 | United Kingdom . |
| 2 144 262 | 2/1985 | United Kingdom . |
| 86/01648 A1 | 3/1986 | WIPO . |
| 86/05039 | 8/1986 | WIPO . |
| 87/01882 A1 | 3/1987 | WIPO . |

OTHER PUBLICATIONS

*IEEE Journal of Quantum Electronics*, vol. QE–11, No. 10, Oct. 1975, New York, US, pp. 822–833, J.B. Marling, "Ultraviolet Ion Laser Performance and Spectroscopy–Part I: New Strong Noble–Gas Transitions Below 2500 A", A. Laser Design.

*Soviet Journal of Quantum Electronics*, vol. 7, No. 6, Jun. 1977, New York, pp. 708–714, V.V. Zhukov et al., "Recombination Laser Utilizing Vapors of Chemical Elements.II.Laser Action Due ot Transitions in Metal Ions".

*Patent Abstracts of Japan*, vol. 015, No. 479 (E–1141), 5 Dec. 1991 & JP–A–03 207 100 (Mitsubishi Electric), 10 Sep. 1991.

*Patent Abstracts of Japan*, vol. 14, No. 316 (E–949)(4259), 5 Jul. 1990 & JP–A–02 105 479 (Toshiba), 18 Apr. 1990.

*Journal of Applied Physics*, vol. 52, No. 10, Oct. 1981, New York, pp. 6021–6024, F. Collier et al., "High Pressure Infrared Xenon Laser Excited By a UV Preionized Discharge".

*Journal of Applied Physics D. Applied Physics*, vol. 22, No. 1, 14 Jan. 1989, Letchworth GB, pp. 29–34, M. Nehmadi et al., "Magnetic Pulse Compression for a Copper Vapour Laser".

*Primary Examiner*—Leon Scott, Jr.
*Attorney, Agent, or Firm*—Nixon & Vanderhye, P.C.

[57] ABSTRACT

A resonant power circuit which supplies pulsed power to a load, such as a pulsed laser, from a d.c. supply by cyclically charging a capacitor. The capacitor is discharged through the load on closure of a switch which should then open to allow the capacitor to re-charge. Occasionally the switch fails to open and the circuit of the invention then develops and applies a reverse voltage to the switch to force it to become open circuit.

20 Claims, 3 Drawing Sheets

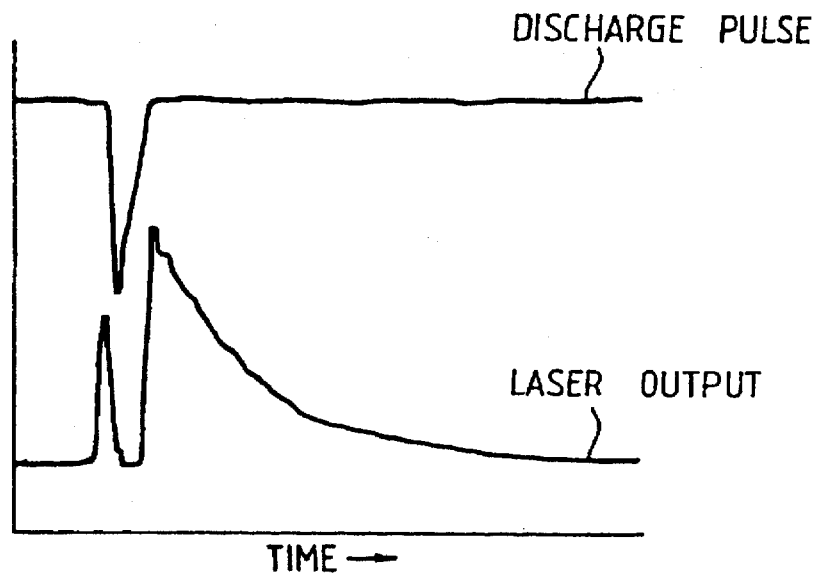
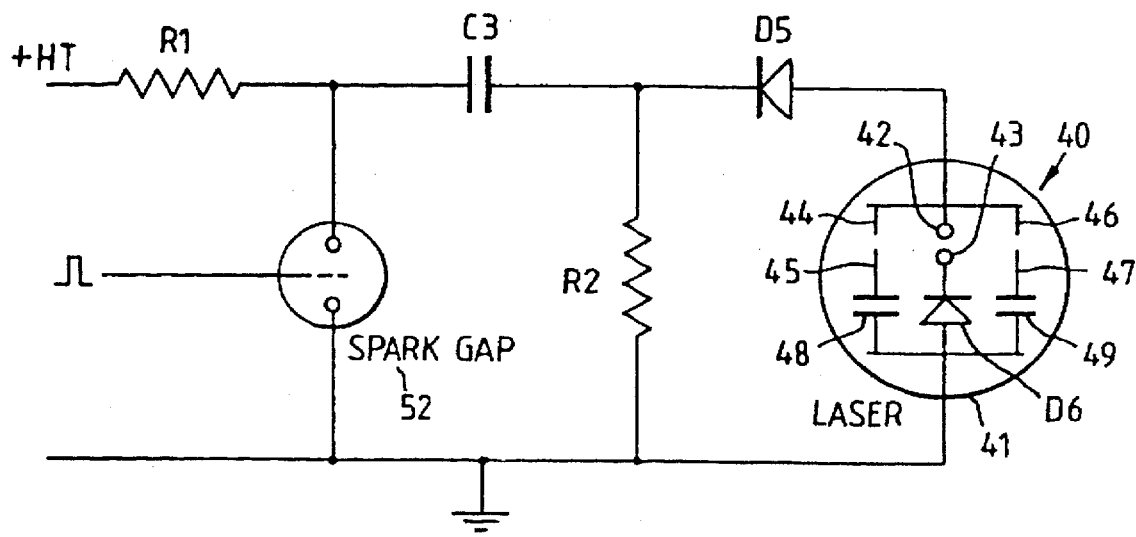

1

PULSED GAS LASERS

BACKGROUND OF THE INVENTION

1. Field of the Invention

This invention relates to pulsed gas lasers such as recombination lasers and transverse excited atmospheric (TEA) lasers. Such recombination lasers are a class of gas lasers and derive most of the excitation of lasing action from recombination of ions following ionisation of a gas by an electrical discharge. Descriptions of recombination lasers are found for example in: V V Zhukov, E L Latush, V S Mikhalenskin, M F Sem, Sov J Quantum Electron 7, 704 (1977); and descriptions of TEA lasers are in: F Collier, B Lacour, M Maillet, M Michon, J Appl Phys 52 (10), Oct 1981; and RSRE Memo 4384, authors R C Hollins, D A Orchard, and A S Swanson, available from DRIC UK.

2. Description of Prior Art

A typical recombination laser comprises a cooled tube through which a gas mixture, eg of He-Xe, or xenon, is flowed. At each end of the tube are electrodes connected to capacitors. Adjacent the tube ends are mirrors, one a completely reflecting mirror, the other a partial reflector forming a light output window. Rapid discharging of the capacitors causes ionisation of the laser gas in the tube to energy levels above a lasing energy level. After the electrical discharge pulse ends, the excited gas recombines and emits light. For a He-Xe gas this light has lines at 2.03, 2.65, 3.43, and 3.65 µm, ie in the so called mid infra red wavelengths.

One type of pulsed gas laser is described in Patent Abstracts of Japan Vol 15, No 258 (E-1084) 28-06-1991 and Japan-A-3083384. Improved electrode lifetime is provided by connecting the cathode of a diode to the abode of the main discharge electrode, and the anode of the diode to the cathode of the discharge electrode. The purpose of the diode is to prevent arc generation, with consequential surface pitting damage, between the discharge electrodes caused by reverse voltages.

SUMMARY OF THE INVENTION

The present invention improves the amount of laser light emitted by a recombination laser after the electrical discharge pulse has ended.

The invention may also improve the efficiency of other gas lasers by removing current oscillations in the laser gas after the initial lasing pulse is completed and retaining electrical energy in the circuits for the next discharge pulse.

The invention may also improve the pulse repetition frequency (prf) from a typical value of less than 10 Hz to about 20 kHz in some constructions of gas lasers.

According to this invention the laser light output is improved by preventing electrical current oscillations in the laser gas after the initial electrical discharge pulse has ended, by use of rectifying diodes in the electrical circuit supplying the discharge pulse.

According to this invention a recombination pulsed gas laser comprises:

a laser tube containing a laser gaseous medium, electrodes for causing an electrical discharge in the laser medium, a highly reflecting mirror and laser output coupler adjacent either end of the laser tube to define a laser cavity, electrical circuit means for supplying an electrical pulse to the electrodes, Characterised by diodes arranged in series and parallel with the electrodes to prevent electrical current within the laser tube after the end of the initial electrical pulse.

According to an aspect of this invention the prf is increased by use of a narrow bore quartz laser tube and sub-atmospheric gas pressure.

BRIEF DESCRIPTION OF THE DRAWINGS

The invention will now be described by way of example only with reference to the accompanying drawings of which:

FIGS. 3 to 6 are wavetraces showing laser output for different control circuitry.

FIG. 7 is a block diagram of a TEA laser showing electrical control circuitry.

DETAILED DESCRIPTION OF PREFERRED EMBODIMENTS

Figure 1:
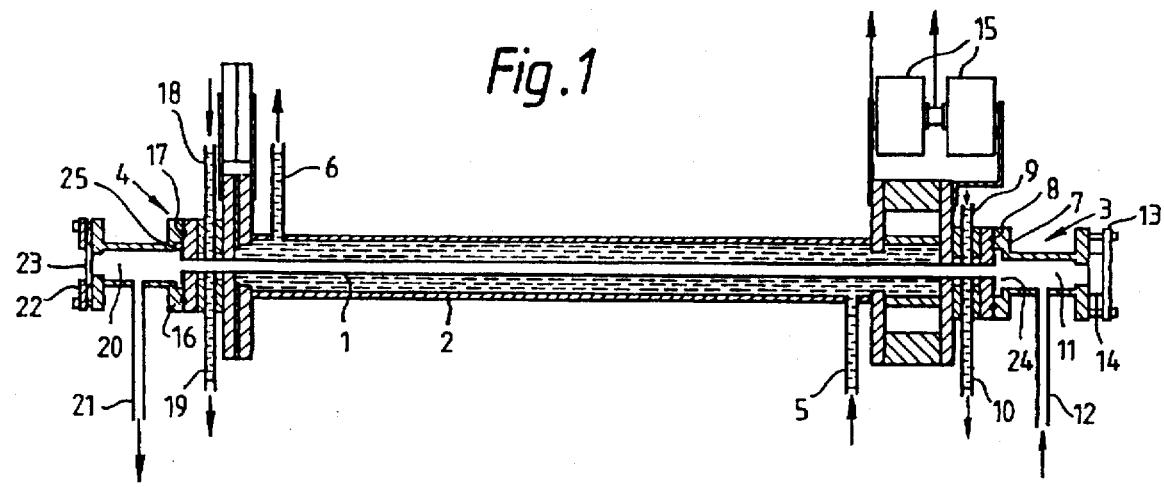
FIG. 1 is a cross sectional view of a He-Xe gas recombination laser.

As shown in FIG. 1 a recombination laser comprises a quartz tube 1 surrounded by a jacket 2 with an annular space between the tube 1 and jacket 2. Inlet 3 and outlet 4 end structures support and locate the tube 1 and jacket. Cooling water inlet 5 and outlet pipes 6 are formed on the jacket 2 so that coolant may be flowed through the annular space and keep the tube 1 at a desired temperature.

The inlet end structure 3 carries inner flanges 7 which fix to the jacket 2, locate o-ring seals 8 on the tube 1, contain flange coolant pipes 9, 10, and support probe-like pointed electrodes 24 at the end of the tube 1. The inlet end structure 3 also includes an inlet chamber 11 into which gas is fed via an inlet pipe 12, and outer flanges 13 which support and locate a high reflectance gold coated copper mirror 14. The inlet end structure 3 also carries two capacitors 15 which form part of the exciting circuit shown more clearly in FIG. 2.

The outlet end structure 4 carries inner flanges 16 which fix to the jacket 1, locate o-ring seals 17 on the tube 1, contain flange coolant pipes 18, 19, and support probe-like pointed Ta electrodes 25 at the end of the tube 1. The outlet end structure 4 also includes an outlet chamber 20 from which gas is removed via an outlet pipe 21, and outer flanges 22 which support and locate a partly reflecting silicon mirror 23 forming a laser output coupler.

For a gas mixture of 250:1 He:Xe a typical inner laser tube dimension is 4 mm, cavity length (distance between mirror 14 and coupler 23) is 60 cm, gas pressure 300 mbar. These values are examples only; the device operates over a wide range of parameter values.

Figure 2:
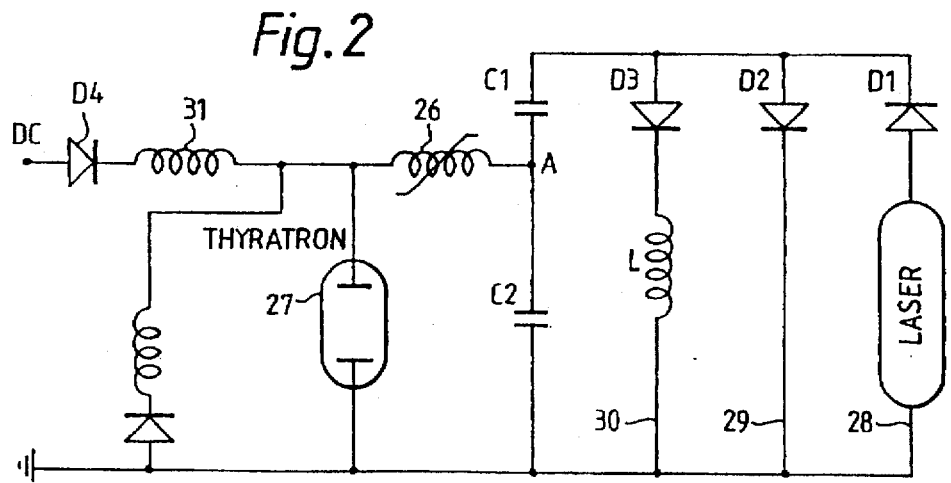
FIG. 2 is a block diagram of the laser of FIG. 1 showing electrical control circuitry.

FIG. 2 shows the electrical control circuit for the laser of FIG. 1. A DC supply of 5 kvolts supplies power via a diode D4 and inductances 31, 26 to a point A between two capacitors C1, C2 each of typically inF value. Between the DC supply lines is a thyratron 27. Connected in parallel with the two capacitors C1, C2 are three lines 28, 29, 30. In one line 28 is the laser and a diode D1 in series; in the second line 29 is a diode D2; and in the third line 30 is an inductance L and diode D3 in series.

In operation to obtain a laser output, the circuit of FIG. 2 is supplied with DC power at 5 kvolts. This results in voltage oscillations along the supply lines, inductance, diode D4 and capacitor C1 and charges up point A between the capacitors to 10 kvolts. The outer sides of the capacitors C1, C2 remain at zero potential due to conduction through the inductance L. When the capacitors C1, C2 are fully charged, the thyratron 27 is caused to short circuit. This causes capacitor C1 to invert its voltage and a doubling of the voltage appearing across the laser, ie to 20 kV. The capacitors C1, C2 discharge across the laser electrodes. As a result the gas is raised to an ionised state above a lasing level. The discharging pulse lasts for less than 1 μs and reduces to zero current as shown in the upper traces of FIGS. 3–6.

When the discharge pulse has finished the excited gas begins to de-excite and lase. After termination of the discharge pulse there still exist significant amounts of electrical energy in the circuit which need to be dissipated. At this point in time the gas is still partly ionised and is conductive. This, in the absence of diodes, allows passage of current through the gas with a consequential reduction or even extinction of lasing activity.

Figure 3:
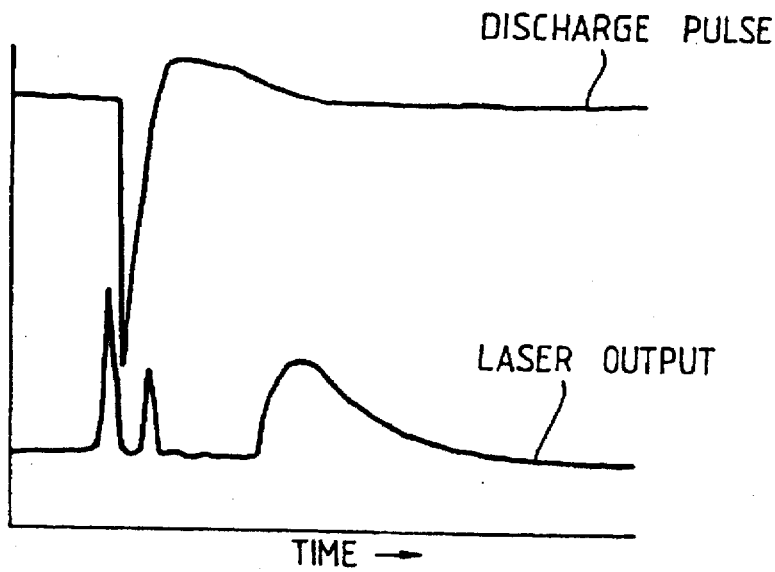

Such an event is shown in FIG. 3, lower trace, where lasing action is reduced to zero by a reverse current through the gas immediately after termination of the discharge pulse, seen in the upper trace.

Figure 4:
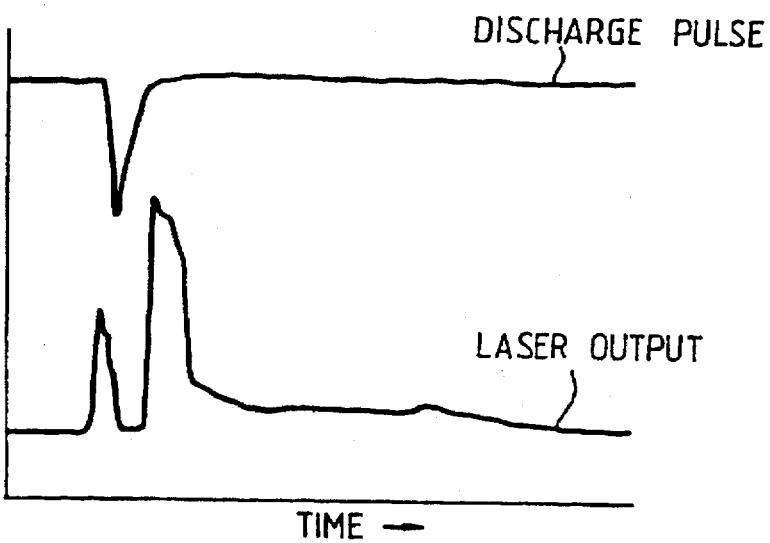
Figure 5:
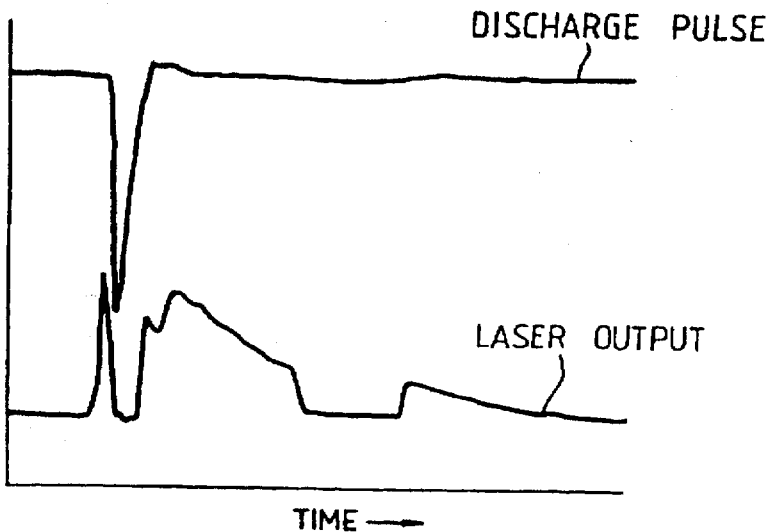

FIG. 4 shows operation of the laser with just diode D2 in the circuit of FIG. 2, ie without D1 and D3. The amount of lasing action is improved from that of FIG. 3. FIG. 5 shows the effect of using diode D1 only, with D2 and associated line, and diode D3 missing. Again an improved laser action is seen; the laser action lasts longer but at a lower level than for FIG. 4. FIG. 6 shows the effect of using diodes D1, D2, in circuit; the amplitude and duration of laser pulse is improved over that obtained for the circuit of FIG. 3.

Suitable diodes D1, D2, D3 are silicon diodes type UF5408 in series parallel arrangement (eg RS Components catalogue number 264-311).

For a laser using He-Xe gas, laser output is improved. Using the design of FIG. 1, a high prf can be used with water cooling, and little or no gas flow through the laser tube; ie the laser can be operated as a sealed system. This enables small, compact, lasers to be used in systems where gas recirculation is difficult or impossible.

In addition to the benefit of reducing current oscillations in the laser gas, the use of diodes may improve overall efficiency by retaining electrical energy stored in the circuit in a form which can contribute to the next discharge pulse.

The invention may also be applied to recombination lasers having a much larger diameter laser tube and flowing gases. Improvement in laser outputs for such a larger laser tube are similar to those illustrated in FIGS. 4 to 6.

Gases other than Xe may be used, eg strontium with helium in a mixture of typically He:Sr of about 1000:1.

The invention may also be applied to transverse excited atmospheric (TEA) lasers. As shown in FIG. 7 a TEA laser 40 has a large diameter laser tube 41 containing convex electrodes 42, 43 about 50 cm long, 0.5 cm wide and spaced about 2.5 cm apart. Also inside the laser tube 41 along both sides of the convex electrodes 42, 43 are a series of pointed electrode pairs 44, 45, 46, 47 each pair being associated with capacitors 48, 49. Mirrors (not shown) at each end of the tube 41 define a laser cavity. The laser tube 41 encloses a gas mixture of He:Xe at a typical pressure in the range 200 mbar to 20 bar.

Control circuitry includes a 10 to 30 kV supply connected via a resistance R1, capacitor C3 and diode D5 to the upper electrodes 42, 44, 46 in the laser tube 41. The lower electrode 43 in the laser tube 41 connects to an earth line. A resistance R2 connects across supply lines 50, 51 into the laser tube 41. A spark gap 52, or other switch eg thyratron, connects between the lines 50, 51.

In operation with the switch 52 open circuit capacitor C3 is charged up by the supply. No electrical current flows through the laser 40 because of the diode D5. When the switch 52 is closed the voltage on capacitor C3, 10 to 30 kV, appears across the laser electrodes 42 to 47. This results in a sparking across the side electrodes 44, 45, 46, 47 with ionisation of the laser gas. Additionally the side capacitors 48, 49 become charged. A discharge occurs between the main laser electrodes 42, 43 causing emission of laser light. The function of diode D5 is to prevent reverse electrical currents and therefore prevent current oscillations in the laser gas. This action enhances recombination laser output.

The invention may also be applied to copper (Cu) gas lasers (not shown). These typically comprise an insulating ceramic laser tube containing lumps of Cu on its inner surface, and closed at its ends by windows. Electrodes at each end of the laser tube act to apply a voltage to He gas contained within the tube. Exterior of the tube are fully and partly reflecting mirrors forming a laser cavity and laser output coupler.

Such a Cu laser emits laser light when a very short voltage ramp pulse is applied to the electrodes. As the electrical discharge drops, the laser ceases to emit light. Electrical oscillations can continue in the tube but do not result in further lasing. Using the circuitry of FIG. 2, these electrical oscillations are damped and their associated energy retained in the charging circuitry ready for the next discharge. The net effect of this is to improve device efficiency by reducing the power supply requirements, and offering a more portable Cu laser with smaller power supplies.

We claim:

1. A recombination pulsed gas laser comprising:
   a laser tube containing a laser gaseous medium,
   electrodes for causing an electrical discharge in the laser medium,
   a highly reflecting mirror and laser output coupler adjacent either end of the laser tube to define a laser cavity,
   an electrical circuit supplying an electrical pulse to the electrodes with at least one diode connected in series with said electrodes preventing electrical current within the laser tube after the end of the initial electrical pulse.

2. The laser of claim 1 wherein the lasing gas is Xe.

3. The laser of claim 1 wherein the lasing gas is Sr.

4. The laser of claim 1 wherein the gas is a mixture of He and Xe.

5. The laser of claim 1 wherein the laser tube is a narrow bore tube.

6. A recombination pulsed gas laser comprising:
   a laser tube containing a laser gaseous medium,
   electrodes for causing an electrical discharge in the laser medium,
   a highly reflecting mirror and laser output coupler adjacent either end of the laser tube to define a laser cavity,
   an electrical circuit supplying an electrical pulse to the electrodes comprising at least one diode connected in parallel with said electrodes preventing electrical current within the laser tube after the end of the initial electrical pulse.

7. The laser of claim 6 wherein the lasing gas is Xe.

8. The laser of claim 6 wherein the lasing gas is Sr.

9. The laser of claim 6 wherein the lasing gas is a mixture of He and Xe.

10. The laser of claim 6 wherein the laser tube is a narrow bore tube.

11. A recombination pulsed gas laser comprising:
    a laser tube containing a laser gaseous medium,
    electrodes for causing an electrical discharge in the laser medium, a highly reflecting mirror and laser output coupler adjacent either end of the laser tube to define a laser cavity, an electrical circuit supplying an electrical pulse to the electrodes comprising at least one diode and inductor in series and said diode and inductor connected in parallel with said electrodes preventing electrical current within the laser tube after the end of the initial electrical pulse.

12. The laser of claim 11 wherein the lasing gas is Xe.

13. The laser of claim 11 wherein the lasing gas is Sr.

14. The laser of claim 11 wherein the lasing gas is a mixture of He and Xe.

15. The laser of claim 11 wherein the laser tube is a narrow bore tube.

16. A recombination pulsed gas laser in which a laser output is obtained by recombination of ions in a laser gaseous medium following ionisation of a gas by an electrical discharge pulse, said laser comprising:

a laser tube having ends and containing a laser gaseous medium, electrodes in contact with the laser gaseous medium and providing ionisation of the laser gaseous medium when supplied with an initial electrical discharge pulse, a highly reflecting mirror and a laser output coupler, each adjacent an end of the laser tube, thereby defining a laser cavity, electrical circuit supplying an initial electrical discharge pulse to the electrodes, at least one diode arranged outside the laser cavity and connected electrically in parallel with the electrodes, and a diode electrically connected in series between the electrical circuit and one of the electrodes, whereby electrical current oscillations in the laser gaseous medium are prevented after the initial electrical discharge pulse has ended.

17. The laser of claim 16 wherein the lasing gas is Xe.

18. The laser of claim 16 wherein the lasing gas is Sr.

19. The laser of claim 16 wherein the lasing gas is a mixture of He and Xe.

20. The laser of claim 16 wherein the laser tube is a narrow bore tube.

* * * * *

UNITED STATES PATENT AND TRADEMARK OFFICE
CERTIFICATE OF CORRECTION

PATENT NO. : 5,684,814
DATED : November 4, 1997
INVENTOR(S) : HOLLINS et al

It is certified that error appears in the above-identified patent and that said Letters Patent is hereby corrected as shown below:

On the Title page, item [57] Abstract, please delete Abstract and insert the following:

[57]                  ABSTRACT

A pulsed gas laser such as a recombination laser comprises a laser tube (1, 41) enclosing a gaseous medium such as He-Xe or He-Sr. A mirror (14) near one end of the tube (1) and an output coupler (23) near the other end define a laser cavity and allow laser light to be emitted. Electrical control circuitry, and electrodes (21, 25) at the end of the laser tube in the laser cavity, apply a short voltage discharge pulse to the gas; this raises the gas to an excited state. Following the end of this pulse the gas recombines and lases, causing emission of a short laser output pulse. The invention improves the amplitude and duration of laser output pulse by providing one or more diodes (D1, D2, D3, D5, D6) in the laser control circuitry; these reduce current oscillations in the laser gas following ending of the initial discharge pulse.

Signed and Sealed this

Seventeenth Day of February, 1998

*Attest:*

BRUCE LEHMAN

*Attesting Officer*      *Commissioner of Patents and Trademarks*